Feb. 21, 1933.   J. W. BAUER   1,898,164
PLANT SUPPORT
Filed Dec. 11, 1930
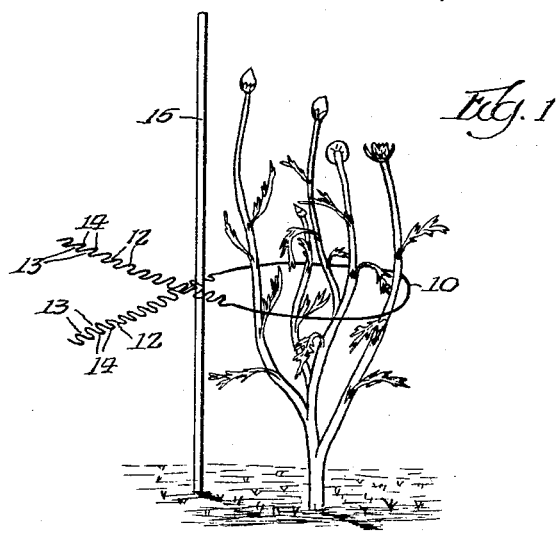
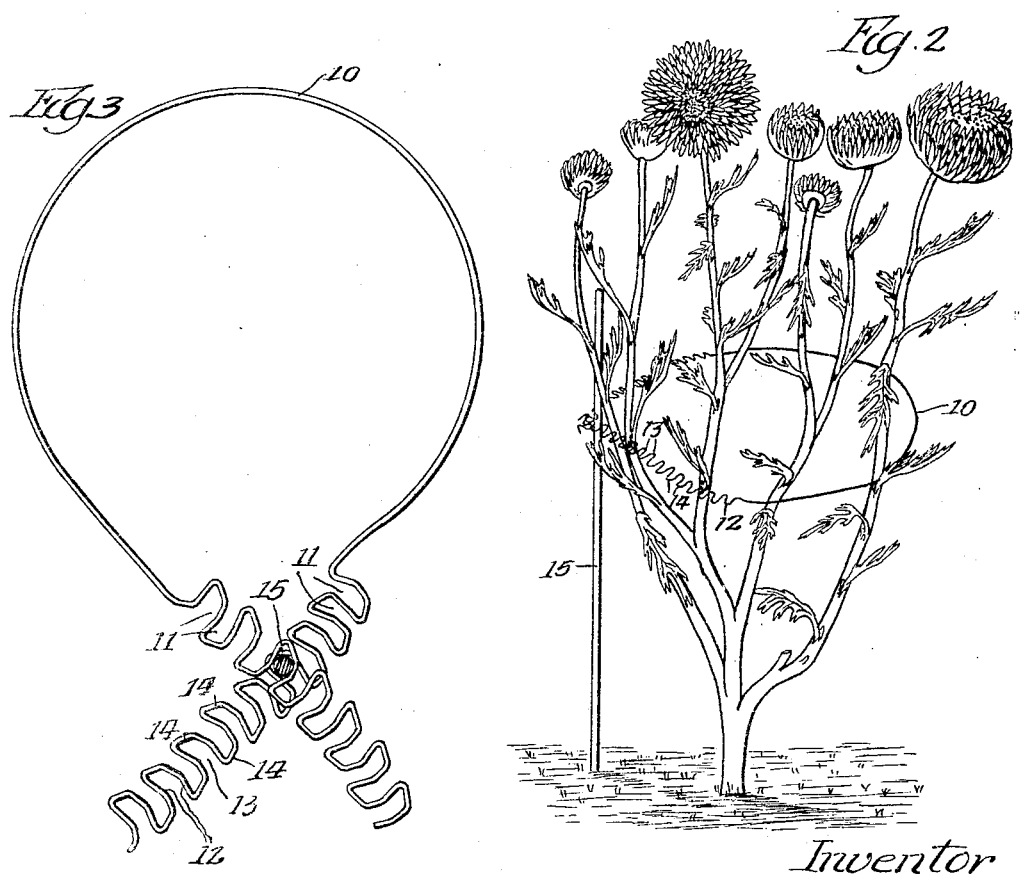
Inventor
John W. Bauer
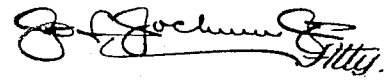

Patented Feb. 21, 1933

1,898,164

UNITED STATES PATENT OFFICE

JOHN W. BAUER, OF NAPERVILLE, ILLINOIS

PLANT SUPPORT

Application filed December 11, 1930. Serial No. 501,543.

This invention relates to improvements in plant supports, by means of the use of which growing plants will be held up and prevented from drooping or falling.

It is common practice with florists to employ stakes for separate plants and to connect these stakes by means of wires or cords arranged parallel and transversely with respect to each other to form boxes or squares in which the plant grows, so as to support the plants when being sprayed, but as the plant grows the branches or leaves engage under such wire or cord or become entangled therewith so that considerable difficulty is experienced in removing the plant without stripping some of the leaves and often branches therefrom, thereby not only injuring the plant, but materially reducing the commercial value thereof.

The same objection and difficulty arises by means of the use of the ordinary cord which some florists employ, which cord encircles the plant with the ends of the cord tied to the stake.

In the latter instance, when the plant grows it is necessary to cut the cords and employ other cords so as to permit of the natural expansion of the branches.

As the plants grow, additional wires or cords are necessary which require considerable labor and time to arrange and attach the same.

It is one of the objects of the present invention to provide an improved plant support which will be of a simple construction, readily applicable and detachable when desired, and which will not injure the plant at any time, and at the same time may be readily adjusted to compensate the growth of the plant.

A further object is to provide an improved support of this character consisting of a single piece of flexible material preferably in the form of pliable wire which is adapted to encompass the plant and support the branches thereof and to hold its shape when looped around the plant, the ends of which wire or flexible member are shaped to form open notches facing in opposite directions, whereby the ends of the support may be readily engaged with a supporting stake and frictionally held in position, thereby preventing the support from dropping down.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating this invention, and in which Figure 1 is a perspective view of a support of this character constructed in accordance with the principles of this invention, showing the same as applied to a stake for supporting a young plant.

Figure 2 is a view similar to Figure 1, showing the manner in which the support may be adjusted to compensate the growth of the plant.

Figure 3 is a top plan view of one of these supports, showing the same attached to a stake, the stake being in section.

In carrying out this invention the support is formed of a single piece of pliable material such as metal, preferably in the form of a wire 10 of any desired length and of sufficient pliability to retain its shape when bent into the form of a loop, and each extremity of the wire 10 is bent back and forth upon itself to form recesses 11 alternately opening through opposite sides of the support, and any number of these recesses may be formed.

The bottom of each of the recesses is preferably inclined to the longitudinal axis of the support and the side walls 12 of each of the recesses are shaped to form restricted inlet openings 13 for the respective recesses. The walls 12 together with the bottoms 14 of the recesses are so shaped as to cause the walls 12 to be resilient so that when the ends of the support are secured to a stake 15, the stake will enter one of the recesses by forcing the end of the support toward the stake. This will cause the walls 12 to yield sufficiently to permit the entrance of the stake into the recess and will then frictionally bind upon the stake so that when the support is passed around the plant and the ends fastened to the stake the support will not slip down upon the stake but will remain in the position to which it has been secured.

In Figure 1 the support is shown applied to a stake and encompassing a young plant, in which event the body portion 10 is shaped to form a loop of a sufficient diameter to loosely hold the plant against drooping, and the respective ends of the body portion 10 are engaged with the stake at any desired point.

As the plant grows the ends of the support are detached from the stake 15 and the support or loop expanded so as not to injure the branches, after which the ends are again frictionally secured to the stake 15 at points adjacent the free extremities of the ends of the body portion.

When it is desired to cut the branches from the plant, the support or loop may be removed by either detaching both ends thereof from the stake or by detaching only one end. If one end only is detached then the support will remain secured to the stake 15 by one end so that the support will not become displaced or lost.

By the use of this improved support it will be manifest that the same may be applied to the plant and secured to the stake in several ways. One way would be to pass or loop the support or wire around the plant before either end is secured to the stake and then fasten the ends to the stake, or one end of the support may be first secured to the stake, the support then passed around the plant and the other end secured to the stake. In either instance, however, the diameter of the loop formed by the support may be readily adjusted before both ends are secured to the stake, so as not to injure the plant.

As the plant grows and as additional supports are required they may be applied to the stake in the same manner as the first support is applied, and in that instance the stake 15 will be of a sufficient height to permit of the use of as many supports as desired.

This improved support is particularly advantageous in the event that a plant should grow one sided, that is if one side attains greater growth than the other in the growing stage, as the support or tie wire may be adjusted to meet such conditions, by securing the ends of the support at different points spaced lengthwise of the stake 15, so that one end of the support will be higher than the other and with the tie wire encircling the plant with the lower portion adjacent the side where there is a deficiency in growth.

Furthermore the support or wire loop is of such a nature that it will yield to the sway of the plant without danger of cutting or injuring the plant and is also adapted for a swinging movement with the plant. When the ends of the wire or loop are secured to the stake in proximity to each other as shown in the drawing, the loop formed will be capable of pivotal movement with respect to the stake, and while the loop thus formed is more or less resilient, the resilience thereof is not sufficiently great to cause difficulty in adjusting or applying the same to the stake, or to form a comparatively rigid loop, which rigidity would tend to injure the plant.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A plant support formed of a single piece of flexible material shaped to form a loop to encircle the plant and adapted to be freely varied in diameter, the ends of said loop being bent back and forth upon itself to form a series of adjacent recesses alternately opening in opposite directions, the recesses adapted to engage over a support having a continuous straight surface to frictionally and detachably secure the ends of the loop thereto at any point throughout the length of the support, and for separate detachment therefrom while the other end remains secured to the support.

2. In combination, a relatively rigid upright supporting member having a continuous straight surface, a plant support for holding up the plant, said plant support being formed of a flexible body portion adapted to encircle the plant to form a loop variable in diameter, means for independently and detachably anchoring one end of the said body to said member, and means for detachably securing the other end of said body to said member independent of the first said end and at various points lengthwise of the said flexible body.

3. In combination, a relatively rigid upright supporting member, a plant support for holding up the plant, said plant support being formed of a flexible body portion adapted to encircle the plant to form a loop variable in diameter, both of the ends of said body portion being provided with means for independently securing the respective ends to the said supporting member at any point lengthwise of the supporting member, and at various points spaced lengthwise of said body portion, said ends being independently detachable from said supporting member.

4. In combination, a relatively rigid upright supporting member having a continuous straight surface, a plant support for holding up the plant, said plant support being formed of a flexible body portion adapted to encircle the plant to form a loop variable in diameter, both of the ends of said body portion being bent back and forth upon itself to form recesses alternately opening in opposite directions whereby either end of the body may be frictionally and detachably secured to the support at any point throughout the length of the support and independently of the other end.

5. As an article of manufacture a support for growing plants comprising a single flexible element to encircle the plant, each of the ends of said element for a substantial distance from the extremities thereof being shaped to form recesses alternately opening in opposite directions, the portion of the said element intermediate the recessed ends being smooth.

6. As an article of manufacture a support for growing plants formed of a single piece of flexible wire adapted to encircle a plant, each of the ends of said wire for a considerable distance from the respective extremities thereof being bent back and forth upon itself to form recesses alternately opening in opposite directions, the portion of the wire between the recessed ends being smooth.

7. In combination, a relatively rigid upright member, a plant support, said support being formed of a single piece of flexible material adapted to encircle the plant to form a loop variable in diameter, the ends of said support for a substantial distance from the extremities thereof being adapted to be drawn together and overlapped, and means for frictionally securing each of the ends of the support to said upright independently of the other end at various points throughout the length of said ends, either end being detachable from the support while the other end is attached thereto, whereby the size of the loop may be varied by adjusting one end of the encircling member.

8. In combination, a relatively rigid upright member, a plant support, said support being formed of a single piece of flexible material adapted to encircle the plant to form a loop variable in diameter, the ends of said support for a substantial distance from the extremities thereof being adapted to be drawn together and overlapped, and means for frictionally securing each of the ends of the support to the said upright independently of the other end at various points throughout the length of said ends, either end being detachable from the support while the other end is attached thereto, whereby the sides of the loop may be varied by adjusting one end of the encircling member, the said loop being adapted for swinging movement with the plant and with respect to the said upright.

In testimony whereof I have signed my name to this specification, on this 15th day of November, A. D. 1930.

JOHN W. BAUER.